May 20, 1952 L. J. TESKE 2,597,404
PRESSURE COMPOUNDING DEVICE FOR HYDRAULIC SYSTEMS
Filed March 3, 1949 2 SHEETS—SHEET 1
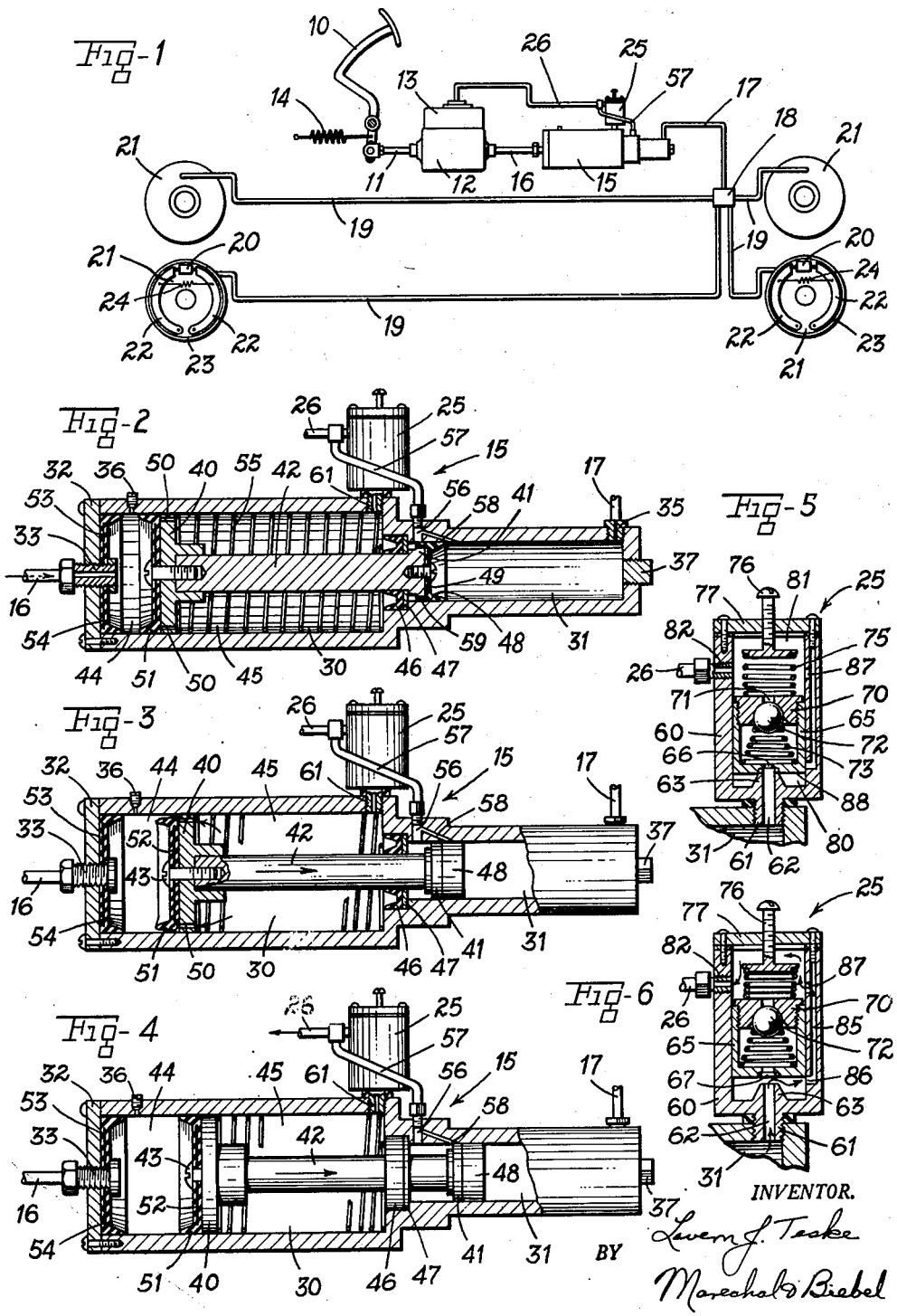
INVENTOR.
Levern J. Teske
BY Marechal & Biebel
ATTORNEYS

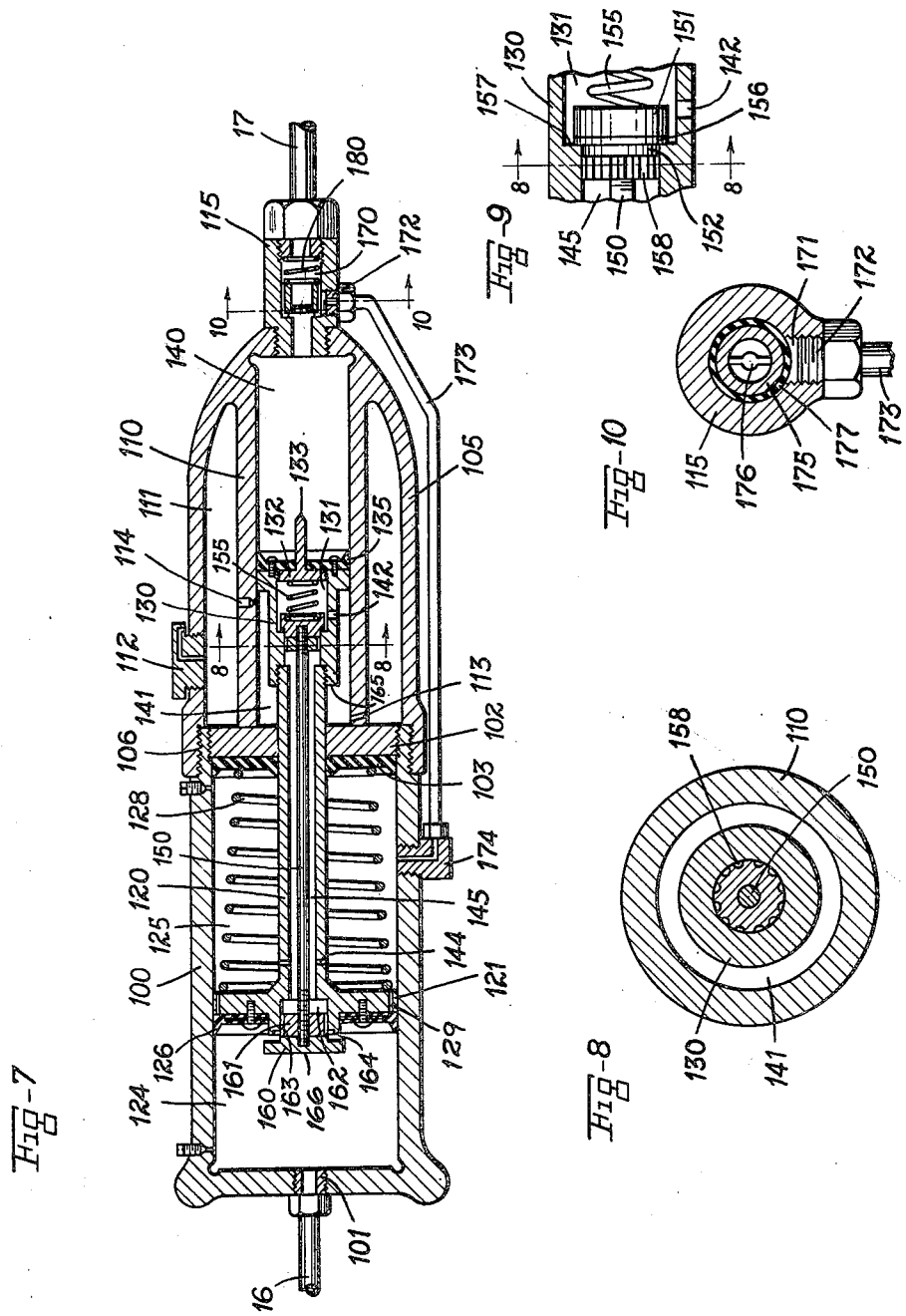

Patented May 20, 1952

2,597,404

UNITED STATES PATENT OFFICE 2,597,404

PRESSURE COMPOUNDING DEVICE FOR HYDRAULIC SYSTEMS

Lavern J. Teske, Hamburg, Wis.

Application March 3, 1949, Serial No. 79,367

8 Claims. (Cl. 60—54.5)

This invention relates to hydraulic braking systems.

One of the principal objects of the invention is to provide a pressure compounding device for use in a hydraulic braking system which is of simple and economical construction and which is effective to add to the efficiency of the braking system by increasing the speed of application of the brake and the available braking pressure without an increase in foot pressure or pedal movement.

An additional object is to provide a pressure compounding device for a hydraulic braking system which requires only a minor part of the foot pedal stroke to move the brake shoes into contact with the brake drums, leaving the larger part of the pedal stroke for the application of the full braking force.

Another object is to provide a pressure compounding device for a hydraulic braking system of such construction and operating characteristics that there is substantially no lag in operation during the change over from the application of low pressure to bring the brake shoes into contact with the drums and the application of high pressure to give the full braking force.

It is also an object of the invention to provide such a pressure compounding device which is composed of a relatively small number of parts of simple construction, which can be installed directly in a standard hydraulic braking system between the master cylinder and the brake cylinders, and which does not require outside power for operation.

Other objects and advantages of the invention will be apparent from the following description, the accompanying drawing and the appended claims.

In the drawing—

Fig. 1 is a diagrammatic view illustrating a hydraulic braking system incorporating a pressure compounding device in accordance with the invention;

Fig. 2 is a view in longitudinal section through the pressure compounding device and showing the relative positions of the parts when the brake is released;

Fig. 3 is a view similar to Fig. 2 showing the relative positions of the parts during the application of low braking pressure;

Fig. 4 is a similar view showing the relative positions of the parts during the application of the full braking pressure;

Fig. 5 is a view in vertical section through the pressure relief valve and showing the relative positions of the parts therein when the other parts of the device are in the positions shown in Figs. 2 and 3;

Fig. 6 is a view similar to Fig. 5 showing the relative positions of the valve parts during the application of full braking pressure;

Fig. 7 is a view in longitudinal section through a modified construction of pressure compounding device;

Fig. 8 is an enlarged section on the line 8—8 of Fig. 7 and also of Fig. 9;

Fig. 9 is an enlarged view of a fragment of Fig. 7; and

Fig. 10 is an enlarged section on the line 10—10 of Fig. 7.

In the drawings, which illustrate preferred embodiments of the present invention, Fig. 1 shows a hydraulic braking system for a motor vehicle wherein a foot pedal 10 is operatively connected through a piston rod 11 with a piston in a master cylinder 12 having a reservoir 13 for pressure fluid, the pedal 10 being shown as provided with a spring 14 for returning it to the brake releasing position. The pressure compounding device of the invention is indicated generally at 15, and it is connected at one end by a tube 16 with the master cylinder to receive pressure fluid therefrom in response to movement of pedal 10. The opposite end of the pressure device 15 is connected by a conduit 17 with a coupling 18 from which branch conduits 19 lead to the brake cylinders 20 of the four brakes 21, which are shown as provided with brake shoes 22, brake drums 23 and return springs 24 for shoes 22. A pressure relief valve 25 is mounted on the pressure device 15 and is shown as connected by a line 26 with the reservoir 13 for the master cylinder.

The internal construction of the pressure compounding device 15 is shown in detail in Figs. 2 to 6. It includes a cylindrical housing formed to provide two coaxial cylinders 30 and 31 of different cross-sectional areas. The larger cylinder 30 is provided with an end cap 32, and the tube 16 from the master cylinder is connected with the interior of cylinder 30 by means of a fitting 33 screwed through cap 32. The smaller cylinder 31 is connected at its outer end to the conduit 17 by a fitting 35, and cylinder 30 is provided with a bleeding plug 36. Cylinder 31 is shown as having a plug 37 in the outer end thereof to provide access for disassembly of the unit.

A piston 40 is reciprocable within the larger cylinder 30, and it is connected with the smaller piston 41 in cylinder 31 by a common piston rod 42, a screw 43 securing piston 40 to the end of rod 42. The piston 40 thus divides the interior of cylinder 30 into a primary chamber 44, which is adapted to receive pressure fluid from the master cylinder through conduit 16, and a secondary chamber 45 located between the primary chamber and the cylinder 31. Chamber 45 is sealed from the interior of cylinder 31 by a double acting sealing cup 46 provided with a retaining washer 47 which is press fitted or otherwise secured within the portion of reduced diameter at the inner end of cylinder 30. The piston 41 in cylinder 31 is also provided with a sealing cup 48, which is shown as formed of rubber having a reinforcing washer 49 molded therein and is bolted or otherwise secured to the end of piston 41.

The larger cylinder 30 is provided with means forming a one-way passage for pressure fluid from the secondary chamber 45 to the primary chamber 44. As shown, the piston 40 is provided with a plurality of bores 50 extending completely therethrough and located adjacent its outer periphery. The piston 40 is also provided with a flexible sealing cup 51 secured thereto by screw 43 within primary chamber 44, and this cup includes a reinforcing washer 52 of such diameter smaller than that of cylinder 30 that the peripheral lip of cup 51 will flex inwardly away from bores 50 when the pressure within chamber 45 is greater than within chamber 44 to open these bores for the passage of fluid from chamber 45, but the cup will seal bores 50 when the pressure within chamber 44 is greater than that in chamber 45. A sealing cup 53 having a reinforcing insert 54 is also provided at the junction between the outer end of cylinder 30 and the cap 32, and this cup is shown as held in proper position by the fitting 33. A spring 55 is mounted in secondary chamber 45 for returning the piston 40 to its release position following release of the foot pedal.

A vent 56 is provided in cylinder 31 from the space between piston 41 and sealing cup 46, and this vent is connected by a tube 57 with the line 26 to the master cylinder reservoir. In addition, the cylinder 31 is formed with a vent 58 which connects the vent 56 with the interior of cylinder 31 at a position ahead of piston 41 when the latter is in its rest position, and vent 58 thus supplies fluid to cylinder 31 directly from the master cylinder reservoir in accordance with changes in the volume requirements of the brake system as the brakes are adjusted and without moving piston 41 from its rest position shown in Fig. 2. Piston 41 is also formed with bores 59 similar to the bores 50 in piston 40 which provide passage from vent 56 to the interior of cylinder 31 to the right of piston 41 upon flexing of cup 48.

The pressure relief valve 25 is shown in detail in Figs. 5 and 6. It includes a cylindrical casing 60 provided with a screw fitting 61 threaded into the cylinder 30 and connecting with the secondary chamber 45. A passage 62 through the fitting 61 provides communication from chamber 45 into the interior of casing 60, and inner end of this passage is shown as surrounded by a frusto-conical shoulder or boss 63. A hollow piston 65 is reciprocable within casing 60 and is adapted to seat on the end of boss 63, this end of piston 65 being provided with a passage 66 in line with the passage 62 and surrounded at its outer end by an annular gasket member 67 for sealing engagement with the end of boss 63. The end of piston 65 opposite passage 66 is closed by a threaded plug 70 having a passage 71 therethrough which is controlled by a ball valve 72 and spring 73. A spring 75 is mounted between the outer end of plug 70 and an adjusting screw 76 threaded in the end cap 77 of casing 60, the spring 75 thus serving normally to urge piston 65 into seated relation with boss 63.

The piston 65 thus divides the interior of casing 60 into two separate valve chambers, the chamber 80 in which the boss 63 is located, and the chamber 81 which receives the spring 75 and which is connected with the master cylinder reservoir 13 by the conduit 26 and fitting 82. These chambers are interconnected by a passage 85 in the wall of casing 60 provided with ports 86 and 87 opening into chambers 80 and 81, respectively. However, the port 86 is so located as to be closed by the side of piston 65 when the piston is in the seated position shown in Fig. 5.

It will thus be seen that when the piston 65 is in its seated position, the pressure within secondary chamber 45 of cylinder 30 will be transmitted through the passages 62 and 66 and will act on the inner end of plug 70 in opposition to spring 75, and so long as this pressure remains below the predetermined value to which the spring is adjusted, the valve will remain closed. When the pressure in chamber 45 exceeds this predetermined value, it will overcome spring 75 and move piston 65 away from boss 63, thus establishing direct communication from chamber 45 to the master cylinder reservoir through the passages 62 and 85 and the ports 86 and 87, as shown in Fig. 6. It will also be seen that since the annular end surface 88 of piston 65 is of greater effective area than the inner end of plug 70, there is a greater total pressure effective on the piston when the latter is in its open position shown in Fig. 6 than in the closed position, and acordingly a lower pressure in chamber 45 will hold the piston open than is required to effect its initial opening movement.

In operation with this pressure converting device in a hydraulic braking system such as that shown in Fig. 1, the parts are in the relative positions shown in Figs. 2 and 5 when the brakes are released. When the brake pedal is depressed to apply the brakes, it causes a flow of pressure fluid from the master cylinder 12 through the conduit 16 into the primary chamber 44 of cylinder 30, thus causing the pistons 40 and 41 and the piston rod 42 to move from left to right as viewed in the drawing. During this initial movement, the pressure relief valve 25 remains closed, the piston 65 being in its seated position shown in Fig. 5, and accordingly the fluid in chamber 45 will be forced through bores 50 into chamber 44 to equalize the pressures in the two chambers, the sealing cup 51 being forced to flex away from bores 50 as indicated in Fig. 3.

It will also be seen that at this stage of operation, the available volume for additional fluid in chambers 44 and 45 will be increased only to the extent to which the piston rod 42 is displaced from within chamber 45. As a result, since piston rod 42 is of considerably smaller cross-sectional area than the piston 41, the latter piston will force a correspondingly greater volume of fluid from cylinder 31 into the brake lines 19 than the volume of fluid transferred from the master cylinder to chamber 44 for a given length of stroke of the pistons. The brake shoes 22 will, therefore, be brought into contact with the brake drums 23 very quickly and after only a minor fraction of the total available stroke of the foot pedal 10, leaving the major portion of the pedal stroke for the application of the full braking force.

As soon as the shoes are in contact with the drums, the resistance to further movement of piston 41 increases to such extent that continued downward movement of the foot pedal will create a pressure in chambers 44 and 45 in excess of that for which the spring 75 in the pressure relief valve is adjusted, and when this occurs, piston 65 will be unseated to establish direct communication from chamber 45 through the pressure relief valve to the master cylinder reservoir as already described in connection with Fig. 6. This will in turn effectively open chamber 45 to atmospheric pressure, and the sealing cup 51 will reseat against piston 40 to close bores 50. Thereafter the pressure effective on piston 44 from the master cylinder will be directly transferred to piston 41 through piston rod 42 and compounded in accordance with the difference in cross-sectional areas between these two pistons. Thus during this stage of its operation, the device will act effectively as a hydraulic ram, and the fluid in chamber 45 will offer no resistance to movement of piston 40 except to the extent required to maintain sufficient pressure on valve piston face 88 to hold the valve open.

When the brake pedal is released, the return springs 24 in the brakes will act to return pistons 41, along with piston 40 and piston rod 42, to the positions shown in Fig. 2, the spring 55 aiding in this return movement. This forces the fluid in chamber 44 back into the master cylinder, and since there is an accompanying pressure drop in chamber 45, the spring 75 will immediately return piston 65 to its seated position closing the pressure relief valve. Then as the return movement of piston 40 continues, the pressure drop in chamber 45 will create suction effective to unseat the ball valve 72 against its spring 73 and thus to draw fluid back from the master cylinder reservoir through the passage 71 and through the interior of piston 65 and the passages 66 and 62 to refill chamber 45.

Figs. 7 to 9 show another construction of pressure compounding device in which a cup-like casting 100 forms a cylinder corresponding to the cylinder 30 in Figs. 2-4, and the interior of this cylinder 100 is connected with the master cylinder by means of a tube 16 and fitting 101. The opposite end of cylinder 100 is closed by a plug 102 and annular sealing ring 103. A second casting 105 is secured to cylinder 100 by a threaded connection 106, and this casting includes an inner cylindrical portion 110 which corresponds with the cylinder 31 in Figs. 2 to 4. Casting 105 also includes an annular chamber 111 which forms a reservoir provided with a vented cap 112 and connecting with the interior of cylinder 110 through suitable passages 113 and 114. Cylinder 110 accordingly does not require a connection to the master cylinder reservoir, although such connection may be provided if desired. A fitting 115 at the outer end of casing 105 provides for connecting the interior of cylinder 110 with the conduit 17 to the brake cylinders.

A hollow piston rod 120 is mounted for reciprocating movement through the end plug 102 and extends into both of cylinders 100 and 110. Rod 120 includes a piston portion 121 in cylinder 100 which corresponds with the piston 40 and divides the interior of cylinder 100 into a primary chamber 124 and a secondary chamber 125. Piston 121 is provided with sealing cup 126 and a return spring 128 is located in chamber 125 between piston 121 and plug 102. Bores 129 may be provided in piston 121 for cooperation with cup 126 as described in connection with Figs. 2 to 4.

The end of piston rod 120 which is within cylinder 110 carries a hollow piston member 130 enclosing a chamber 131 which is closed at its outer end by a threaded plug 132 having an elongated shank or prong 133. A sealing cup 135 is secured to the outer end of this piston member 130 to form a piston in cylinder 110 of suitably smaller effective area than the piston 121, for example an area which is one-quarter of the area of piston 121. It will be noted that piston 135 divides the interior of cylinder 100 into a chamber 140 connecting with the conduit 17 and an annular chamber 141 which connects with the reservoir 111 through the passages 113 and 114. It will also be noted that a passage 142 connects the chamber 131 with chamber 141, and additional passages 144 connect the interior 145 of the hollow piston rod 120 with the secondary chamber 125 in cylinder 100.

A rod 150 extends through the interior of the hollow piston rod 120 and carries valves at each end which are arranged to connect the interior 145 of the piston rod alternately with the primary chamber 124 in cylinder 100 and with the chamber 131 in the piston member 130. The valve 151 controls the connection between the interior of the piston rod and the chamber 131, and it includes a cylindrical portion 152 (Fig. 9) having a sliding fit in the outer end of the hollow portion of the piston rod. A coil spring 155 is mounted between the outer end of valve 151 and the plug 132, and this spring is chosen to exert a predetermined force against valve 151 urging it into a position wherein its washer 156 seats on the annular shoulder 157 in chamber 131. A fluid portion 158 (Figs. 8 and 9) of valve 151, shown as a separate member threaded on rod 150, provides for communication between the interior of the piston rod and the chamber 131 when valve 151 is moved sufficiently against spring 155 for its cylindrical portion 152 to clear the shoulder 157.

The valve 160 at the opposite end of rod 150 is adapted to seal the connection between the interior of the piston rod 120 and the primary chamber 124 when valve 151 is open. Valve 160 is similar in construction to valve 151 and includes a cylindrical portion 161 having a sliding fit within the enlarged bore 162 in piston 121 and a fluted portion 163 similar to the member 158 as just described. The inner surface of valve 160 is ground to fit tightly against the annular shoulder or seat 164 or pinion 121, and valves 151 and 160 are arranged in such spaced relation on rod 150 that when one of these valves is in fully seated position, the other is open and vice-versa.

The operation of this form of the invention is similar to that described in connection with Figs. 2 to 6. When the brakes are released, the pistons 121 and 135 are at their limit of travel for right to left as viewed in Fig. 7, in which position the shoulder 165 on the piston member 130 will be seated against the plug 102. In this position of the parts, there will be no pressure effective in cylinder 100, and the spring 155 will hold valve 151 in the seated position shown in Figs. 7 and 9. It will also be noted that when piston 135 is in this rest position, the passage 114 will be open into chamber 140 to supply fluid directly thereto from reservoir 111 as required during adjustment of the brakes.

In order to assure consistent operation of this device, the relative areas of the pistons, the piston rod 120 and the valves 151 and 160 are correlated with the pressure exerted by spring 155. For example, piston 121 may be four times the area of piston 135, and the latter piston in turn may have twice the area of piston rod 120 in cross section. Similarly the end face 166 of valve 160 should be eight times the area of that portion of valve 151 which is opposed to pressure exerted in piston rod 120 in a direction tending to open valve 151 against spring 155.

When the brake pedal is depressed, fluid is forced from the master cylinder into the primary chamber 124, and this causes movement of the pistons 121 and 135 and the piston rod 120 to the right as viewed in Fig. 7. During this initial movement, until the brake shoes are brought into contact with the drums, fluid will be transferred from secondary chamber 125 into primary chamber 124 through the passages 144 and chamber 145 past the open valve 160. There will also be a temporary transfer of fluid during this stage of operation from reservoir 111 through the passage 113 into chamber 141 to prevent a negative pressure behind piston 135. Since during this movement the effective pressure difference on the two sides of piston 121 is equal only to the cross-sectional area of the piston rod 120, it will be seen that with the relative sizes indicated above, the pressure in cylinder 100 will be twice that in the chamber 140 in cylinder 110. Thus if, for example, spring 155 is selected to yield and permit valve 151 to open when the pressure in chamber 140 is 100 pounds per square inch, this yielding action will not take place with the relative sizes as stated until the pressure in cylinder 100 reaches 200 pounds per square inch.

When this desired pressure condition is reached and spring 155 is overcome, the rod 150 will be shifted against the spring until valve 160 seats on the end of the piston rod to seal the chamber 145 from primary chamber 124. Since this movement of rod 150 shifts the valve 151 to its open position, the secondary chamber 125 is thus placed in direct connection with reservoir 111 through the passages 144, the interior 145 of rod 120, the chamber 131, the passage 142, and the chamber 141 and passages 113 and 114. Since the reservoir 111 is under atmospheric pressure through the vented cap 112, this will relieve the pressure in secondary chamber 125, and thereafter the device will function as a hydraulic ram in essentially the same manner as described in connection with Fig. 4.

When the brake pedal is released, the pistons return to their normal positions under the pressure of the springs in the brake cylinders and the return spring 128. However, since when valve 160 is closed, its exposed surface 166 offers an effective pressure area which is eight times the effective area of valve 151 against which the pressure could act in initially opening valve 151 against spring 155, the rod 150 will initially remain in its previous position. Thus valve 160 will remain closed and valve 151 open to permit fluid within chamber 141 to return to the secondary chamber 125 through the passages 142 and 144 and the hollow interior 145 of the piston rod.

This condition will continue until the pressure in primary chamber 124 drops to 25 pounds per square inch, at which point the total pressure effective on valve 160 will equal the total pressure effective on valve 151 when the latter valve initially opened. Spring 155 will accordingly then be effective to shift rod 150 back to the position shown in Fig. 7, thus closing valve 151 and opening valve 160, and during the remainder of the return stroke of the pistons, fluid is supplied from chamber 124 to chamber 125 through the opening at valve 160 and the passages 144. Also, since when the pressure in chamber 124 is 25 pounds per square inch, the effective pressure in chamber 140 is 100 pounds per square inch, it will be seen that the return shifting movement of rod 150 takes place at the same point in the return stroke of the pistons as in their pressure stroke.

Figs. 7 and 10 also illustrate means for assuring operation of the brakes in the event that additional braking force is required after the pistons 121 and 135 have traveled through their full stroke. The fitting 115 encloses a chamber 170 having an opening 171 (Fig. 10) in the side thereof which receives a fitting 172. A tube 173 leads from the fitting 172 to another fitting 174 in the side of cylinder 100. A sleeve 175 having an internal web 176 and a sealing jacket 177 is slidably mounted within chamber 170, and a spring 180 normally urges this sleeve from right to left as viewed in Fig. 7 to a position wherein it covers and closes the opening 171.

It will be seen that in the normal operation of this device, the brakes will be fully applied considerably before the pistons and piston rod reach the limit of their stroke, and the pressure fluid will be forced from chamber 140 into conduit 17 through the sleeve 175. However, if this should not occur and if the pistons reach the limit of their stroke without applying the desired braking force, the shank or prong 133 will engage web 176 and force sleeve 175 to the right against spring 180, thus opening the connection at 171 into chamber 170. Since piston 121 will by this time have moved past the fitting 174, further movement of the brake pedal will cause fluid to be forced from chamber 124 directly through the tube 173 into the brake lines.

It will accordingly be seen that the present invention provides simple and effective devices for materially increasing the operating efficiency of a hydraulic braking system, and the component parts of these devices are of simple construction promoting economical manufacture and an extended operating life. In operation with one of these devices, the initial movement of the brake shoes into contact with the drums is accomplished by the introduction of a relatively small volume of the pressure fluid from the master cylinder and a correspondingly small fraction of the pedal stroke, leaving the major portion of the stroke for developing the full braking force. In addition, these devices provide for continuous application of the brakes as the pedal is depressed, with no lag during the change over from the initial low pressure application to the high pressure application of braking force, since the shift from low to high pressure is substantially instantaneous simultaneously with the opening of the pressure relief valve.

The invention has the further advantage of providing a self-contained unit which can be readily incorporated in existing hydraulic braking systems without other changes or adjustments to give increased efficiency to the system, and in general a single standard design will fit a wide variety of existing braking systems. It should also be noted that these devices depend in operation primarily on only two simple relationships therein, i. e. the difference between the areas of the small piston and the piston rod, which establishes the volume of fluid required to force the shoes into contact with the drums, and the difference in area between the two pistons, which establishes the pressure available for braking as compared with the effective pressure developed by the master cylinder. The devices can accordingly be readily designed by selection of suitable dimensions for these parts to deliver desired operating characteristics in accordance with the system in which it is to be installed.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is.

1. A pressure compounding device adapted for use in a hydraulic braking system including a brake cylinder and a master cylinder, comprising a casing defining a pair of cylinders of different cross-sectional areas, means connecting the larger of said cylinders to said master cylinder to receive pressure fluid therefrom, means connecting the smaller of said cylinders to said brake cylinder to deliver pressure fluid thereto, a large piston operable in said larger cylinder and separating the interior thereof into a primary chamber adapted to receive pressure fluid from said master cylinder and a secondary chamber, a small piston in said smaller cylinder, a piston rod reciprocable in said casing for connecting said pistons for operation in unison, a reservoir in said casing for pressure fluid, means including a passage in said piston rod connecting said secondary chamber with said reservoir and with said primary chamber, valve means controlling said passage and mounted for shifting movement between a position connecting said secondary chamber with said primary chamber and a position connecting said secondary chamber with said reservoir, means normally maintaining said valve means in said position connecting said secondary chamber with said primary chamber when the pressure within said secondary chamber is below a predetermined pressure, and means for shifting said valve means to said position connecting said secondary chamber with said reservoir when the pressure in said secondary chamber exceeds said predetermined pressure.

2. A pressure compounding device adapted for use in a hydraulic braking system including a brake cylinder and a master cylinder, comprising means forming a pair of cylinders of different cross-sectional areas, means connecting the larger of said cylinders to said master cylinder to receive pressure fluid therefrom, means connecting the smaller of said cylinders to said brake cylinder to deliver pressure fluid thereto, a large piston operable in said larger cylinder and separating the interior thereof into a primary chamber adapted to receive pressure fluid from said master cylinder and a secondary chamber, a small piston in said smaller cylinder operable in response to operation of said large piston, pressure relief means operable at a predetermined pressure to relieve the pressure in said secondary chamber, and means forming a valved passage for delivery of pressure fluid from said secondary chamber to said primary chamber during movement of said large piston in response to the introduction of pressure fluid from said master cylinder into said primary chamber while said pressure relief means is closed, and means operable substantially upon completion of the forward movement of said pistons for directly connecting said master cylinder with said brake cylinder to deliver additional pressure fluid thereto.

3. A pressure compounding device adapted for use in a hydraulic system including a brake cylinder and a master cylinder, comprising means forming a pair of coaxial cylinders of different cross-sectional areas, means for connecting the larger of said cylinders to said master cylinder to receive pressure fluid therefrom, means for connecting the smaller of said cylinders to said brake cylinder to deliver pressure fluid thereto, a large piston operable in said larger cylinder and separating the interior thereof into a primary chamber adapted to receive pressure fluid from said master cylinder and a secondary chamber located between said primary chamber and said smaller cylinders, a small piston in said smaller cylinder, a piston rod connecting said pistons and extending through said secondary chamber, means forming a valved passage for delivery of pressure fluid from said secondary chamber to said primary chamber during movement of said larger piston in response to the introduction of pressure fluid from said master cylinder into said primary chamber, means operable in response to a predetermined pressure in said secondary chamber to relieve the pressure therein, a passage for connecting said larger cylinder directly with said brake cylinder, said passage being positioned for direct connection with said primary chamber substantially upon completion of the maximum forward movement of said large piston, a valve in said smaller cylinder normally closing said passage, and means on said small piston for opening said valve as said rod approaches the limit of forward movement thereof to effect direct connection of said brake cylinder with said master cylinder to receive additional pressure fluid therefrom.

4. A pressure compounding device adapted for use in a hydraulic braking system including a brake cylinder and a master cylinder, comprising a casing defining a pair of cylinders of different cross-sectional areas, means for connecting the larger of said cylinders to said master cylinder to receive pressure fluid therefrom, means for connecting the smaller of said cylinders to said brake cylinder to deliver pressure fluid thereto, a large piston operable in said larger cylinder and separating the interior thereof into a primary chamber adapted to receive pressure fluid from said master cylinder and a secondary chamber, a small piston in said smaller cylinder, a hollow piston rod connecting said pistons and extending through said secondary chamber, a reservoir in said casing for pressure fluid, means including said hollow piston rod forming a connection between said reservoir and said secondary chamber, normally closed valve means controlling said connection and effective in response to a predetermined pressure in said secondary chamber to open said connection for flow of fluid from said secondary chamber into said reservoir, and means including said hollow piston rod forming a passage connecting said secondary chamber and said primary chamber for flow of pressure fluid during movement of said large piston while said valve means is closed, a valve for controlling said passage, and a rod reciprocable within said hollow piston rod carrying both said valve and said valve means for operation in unison when the pressure in said secondary chamber rises above or falls below said predetermined pressure.

5. A pressure compounding device adapted for use in a hydraulic braking system including a master cylinder and a work cylinder, comprising a casing forming a pair of cylinders of different cross-sectional areas, means for connecting the larger of said cylinders to said master cylinder to receive pressure fluid therefrom, means for connecting the smaller of said cylinders to said work cylinder to deliver pressure fluid thereto, a large piston operable in said larger cylinder and separating the interior thereof into a primary chamber adapted to receive pressure fluid from said master cylinder and a secondary chamber, a small piston in said smaller cylinder operable in response to operation of said large piston, a reservoir in said casing for pressure fluid, a piston rod reciprocable in said casing and connecting said pistons for operation in unison, said small piston being of lesser effective area than said large piston and being of greater effective area than the cross-section of said piston rod, said piston rod being hollow to provide a passage for connecting said primary chamber with said reservoir and having a port therein connecting said passage with said secondary chamber, a rod reciprocable within said passage, a valve on each end of said rod for alternately closing either end of said passage, means normally biasing said rod in the direction to close the valve thereon between said passage and said reservoir leaving said secondary chamber connected with said primary chamber, and said rod being shiftable upon overcoming of said biasing means by the pressure in said passage against said closed valve to a position opening said valve to connect said secondary chamber with said reservoir and simultaneously closing the other said valve between said passage and said primary chamber.

6. A pressure compounding device adapted for use in a hydraulic braking system including a master cylinder and a work cylinder, comprising a casing forming a pair of cylinders of different cross-sectional areas, means connecting the larger of said cylinders with said master cylinder, means for connecting the smaller of said cylinders with said work cylinder, a large piston in said larger cylinder separating the interior thereof into a primary chamber connected with said master cylinder and a secondary chamber, a small piston in said smaller cylinder, a reservoir in said casing for pressure fluid, a piston rod reciprocable in said casing and connecting said pistons for operation in unison, said small piston being of lesser effective area than said large piston and of greater effective area than the cross-section of said piston rod, said piston rod being hollow to provide a passage for connecting said primary chamber with said reservoir and having a port therein connecting said passage with said secondary chamber, a rod reciprocable within said passage, a first valve carried by said rod in said primary chamber for closing the adjacent end of said passage, a second valve at the opposite end of said rod for closing the connection between said passage and said reservoir, means for biasing said rod in the direction to close said second valve leaving said secondary chamber connected with said primary chamber, said rod being shiftable upon overcoming of said biasing means by the pressure in said passage against said second valve to a position opening said second valve to connect said secondary chamber with said reservoir and simultaneously to close said first valve, and the area on said first valve exposed to pressure within said primary chamber in the closed position thereof being substantially greater than the area of said second valve exposed to pressure within said passage in the closed position of said second valve to effect shifting of said rod at the same point in the travel of said piston rod in each direction.

7. A pressure compounding device adapted for use in a hydraulic braking system including a master cylinder and a work cylinder, comprising a casing forming a pair of cylinders of different cross-sectional areas, means connecting the larger of said cylinders with said master cylinder, means connecting the smaller of said cylinders with said work cylinder, a large piston in said larger cylinder separating the interior thereof into a primary chamber connected with said master cylinder and a secondary chamber, a small piston in said smaller cylinder, a reservoir in said casing for pressure fluid, a piston rod reciprocable in said casing and connecting said pistons for operation in unison, said large piston being of greater effective area than said small piston by a predetermined factor, said piston rod being hollow to provide a passage for connecting said primary chamber with said reservoir and having a port therein connecting said passage with said secondary chamber, a rod reciprocable within said passage, a first valve carried by said rod in said primary chamber for closing the adjacent end of said passage, a second valve at the opposite end of said rod for closing the connection between said passage and said reservoir, means for biasing said rod in the direction to close said second valve leaving said secondary chamber connected with said primary chamber, said rod being shiftable upon overcoming of said biasing means by the pressure in said passage against said second valve to a position opening said second valve to connect said secondary chamber with said reservoir and simultaneously to close said first valve, the area of said first valve exposed to pressure within said primary chamber in the closed position thereof being greater by a factor substantially twice as great as said predetermined factor that the area of said second valve exposed to pressure within said passage in the closed position of said second valve.

8. A pressure compounding device adapted for use in a hydraulic braking system including a master cylinder and a work cylinder, comprising a casing forming a pair of cylinders of different cross-sectional areas, means for connecting the larger of said cylinders to said master cylinder to receive pressure fluid therefrom, means for connecting the smaller of said cylinders to said work cylinder to deliver pressure fluid thereto, a large piston operable in said larger cylinder and separating the interior thereof into a primary chamber adapted to receive pressure fluid from said master cylinder and a secondary chamber, a small piston in said smaller cylinder, a reservoir in said casing for pressure fluid, a piston rod reciprocable in said casing and connecting said pistons for operation in unison, said small piston being of lesser effective area than said large piston and being of greater effective area than the cross-section of said piston rod, said piston rod being hollow to provide a passage for connecting said primary chamber with said reservoir and having a port therein connecting said passage with said secondary chamber, a rod reciprocable within said passage, a valve on each end of said rod for alternately closing either end of said passage, means normally biasing said rod in the direction to close the valve thereon between said passage and said reservoir leaving said secondary chamber connected with said primary chamber, said rod being shiftable upon overcoming of said biasing means by the pressure in said passage against said closed valve to a position opening said valve to connect said secondary chamber with said reservoir and simultaneously closing the other said valve between said passage and said primary chamber, and means operable substantially upon completion of the forward movement of said piston rod for directly connecting said master cylinder with said work cylinder to deliver additional pressure fluid thereto.

LAVERN J. TESKE.

REFERENCES CITED

The following references are of record in the file of this patent:

UNITED STATES PATENTS

| Number | Name | Date |
|---|---|---|
| 523,419 | Thorpe | July 24, 1894 |
| 1,620,115 | MacKenzie | Mar. 8, 1927 |
| 2,001,971 | McConkey | May 21, 1935 |
| 2,031,360 | Boughton | Feb. 18, 1936 |
| 2,166,742 | Lambert | July 18, 1939 |
| 2,374,011 | Gunderson | Apr. 17, 1945 |
| 2,443,642 | Rockwell | June 22, 1948 |